United States Patent [19]

Takahashi et al.

[11] Patent Number: 4,951,507

[45] Date of Patent: Aug. 28, 1990

[54] GAS RATE SENSOR

[75] Inventors: Tsuneo Takahashi; Tomoyuki Nishio; Masayuki Ikegami; Takahiro Gunji, all of Saitama, Japan

[73] Assignee: Honda Giken Kogyo Kabushiki Kaisha, Tokyo, Japan

[21] Appl. No.: 295,838

[22] Filed: Jan. 11, 1989

[30] Foreign Application Priority Data

Jan. 13, 1988 [JP] Japan .................................. 63-5396

[51] Int. Cl.$^5$ .............................................. G01P 9/00
[52] U.S. Cl. .................................. 73/497; 73/516 LM
[58] Field of Search .................. 73/497, 505, 516 LM, 73/516 R

[56] References Cited

U.S. PATENT DOCUMENTS 3,500,691  3/1970  Moore .......................... 73/516 LM
4,026,159  5/1977  Isakson et al. ................ 73/516 LM
4,408,490  10/1983 Takahashi et al. .................... 73/497

Primary Examiner—John Chapman
Attorney, Agent, or Firm—Lyon & Lyon

[57] ABSTRACT

Disclosed is a gas rate sensor system which provides an output signal representing an angular velocity of the gas rate sensor when the gas flows more on one of its thermal sensing elements than on the other due to the effect of the angular velocity on the gas flow. The gas rate sensor system can carry out an arithmetic operation for correction of gas rate sensor output signal by renewing and using an effect value to meet the instantaneous temperature change in the gas rate sensor.

2 Claims, 3 Drawing Sheets

GAS RATE SENSOR

BACKGROUND OF THE INVENTION

1. Field of the Invention

The present invention relates to a gas rate sensor which is capable of detecting an angular velocity which has an effect on the gas rate sensor.

2. Description of the Prior Art

In general, a gas rate sensor provides an output signal in response to any difference between the output signals supplied from a pair of thermal sensing elements, which difference appears when the gas flow ejected from a gas nozzle deviates to flow more on one of the thermal sensing elements than on the other due to the influence on the gas flow by an applied motion whose angular velocity is to be determined in terms of its speed and direction.

The angular velocity is determined by detecting a small inbalance in the heat dissipation from the pair of thermal sensing elements due to the deviation of the gas flow, and therefore a surrounding temperature change has a great effect on the sensitivity of the gas rate sensor, particularly an adverse effect of lowering the sensitivity of gas rate sensor. This necessitates the use of temperature compensating means in the gas rate sensor.

In an attempt to reduce the adverse effect caused by the surrounding temperature the gas rate sensor is subjected to forced heating by using appropriate heaters, and the temperature within the gas rate sensor is detected by appropriate temperature sensors, and the temperature within the gas rate sensor is controlled so as to remain constant.

Disadvantageously, the sensitivity of the gas rate sensor and the offset value remain too unstable to provide correct output signals until the temperature within the gas rate sensor has reached a stable condition after connecting the electric heater to an associated power supply. As a matter of fact, no satisfactory gas temperature control has been attained.

With the above in mind one object of the present invention is to provide a gas rate sensor which is capable of correcting the gas rate sensor output signal in a most appropriate way to meet the instantaneous temperature change within the gas rate sensor, allowing the temperature within the gas rate sensor to vary.

To attain this object a gas rate sensor which can provide an output signal in response to any difference between the output signals from a pair of thermal sensing elements due to the effect which an angular velocity exerts on the gas flow ejected from an associated nozzle over the pair of thermal sensing elements, is improved according to the present invention in that said gas rate sensor is equipped with: means to effect temperature compensation of the gas rate sensor output signal by subtracting an offset value from the gas rate sensor output signal; means to determine the resistances of the pair of thermal sensing elements; means to detect the situation in which the resistances of the pair of thermal sensing elements increase or decrease simultaneously; means to make a decision as to whether or not the gas rate sensor output signal remains within a predetermined tolerance when such situation is detected; and means to permit the gas rate sensor output signal to be used as a new offset value when the gas rate sensor output signal remains within a predetermined tolerance.

Other objects and advantages of the present invention will be understood from the following description of a gas rate sensor equipped with temperature compensation means according to one embodiment of the present invention, which is shown in accompanying drawings.

Figure 3:
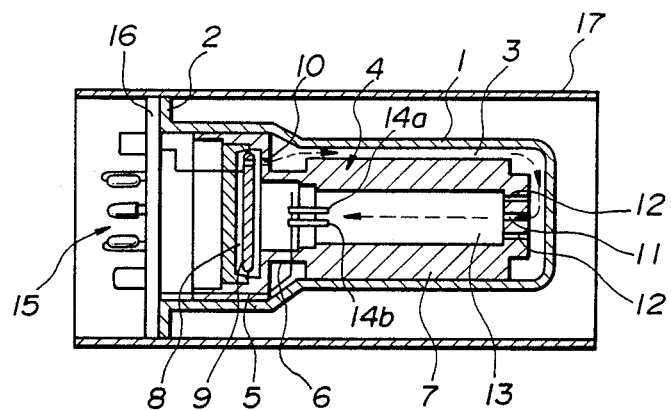
FIG. 3 is a longitudinal section of the gas rate sensor.

FIG. 3 shows a gas rate sensor. Its casing 1 is open at one end, and is closed at the other end. The casing 1 has three longitudinal ridges 120 degrees apart from each other on its inner surface. When the gas rate sensor body 4 is put in the casing 1, these longitudinal ridges define three longitudinal channels 3.

As seen from the drawing, the gas rate sensor body 4 is composed of a holder section 5, a neck section 6 and a cylinder section 7. The holder section 5 serves to confine the gas within the casing 1. The holder section 5 has a pump compartment 8, and the pump compartment 8 contains a diaphragm type piezoelectric pump 9. When the pump 9 works, gas is drawn in the longitudinal channels 3 through the inlets 10 of the holder section 5.

Figure 4:
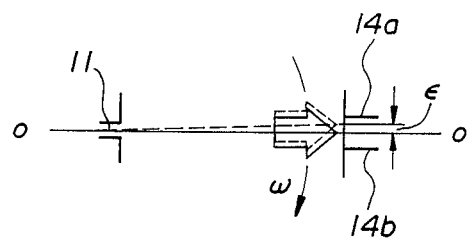
FIG. 4 shows how the gas flow deviates when the gas rate sensor is moved at an angular velocity to be determined.

After passing through a center nozzle aperture 11 and rectifying apertures 12 therearound on the top of the cylinder section 7, the gas is drawn into a sensor compartment 13 in the form of laminar flow. Then, the gas flows over a pair of heating wires 14a and 14b, which are used as thermal sensing elements and are positioned downstream of the sensor compartment 13. Thereafter, the gas flows into the pump compartment 8, where it is directed to the longitudinal channels 3 by pumping. The pair of heating wires 14a and 14b are put symmetrically with respect to the center line o—o of the nozzle aperture 11, as seen from FIG. 4. When no force is applied to the gas rate sensor in a lateral direction, the gas is ejected from the nozzle aperture 11, flowing straight along the center line o—o, and then each of the heating wires 14a and 14b will be exposed to the equal gas flow rate, and hence depriving each heating wire of the same amount of heat.

When a lateral force is applied to the gas rate sensor to cause it to move at an angular velocity $\omega$, the gas flow will deviate from the center line o—o as shown in broken line. The amount of deviation is indicated by "$\epsilon$". As a result, the gas flows more on the heating wire 14a than on the heating wire 14b, thus causing unbalanced outputs from these heating wires 14a and 14b. Then, a signal representing the difference between the unbalanced outputs will appear at the output terminal of the gas rate sensor, and the output signal will be amplified by an amplifier circuit 15. The polarity and amplitude of the amplified signal represents the direction and speed of the angular velocity of the gas rate sensor, respectively.

A printed board 16 of the amplifier circuit 15 is attached to the flange 2 of casing 1 as seen from FIG. 3. A hollow cylinder 17 contains the whole structure of the gas rate sensor.

As a matter of fact, a signal appearing at the output terminal of the gas rate sensor is likely to vary with surrounding temperature. The gas rate sensor output signal x is given by:

$$X = (R_2(T)/R_1(T)) - 1 \tag{1}$$

where $R_1$ (T) stands for the resistance of the heating wire 14a temperature T and $R_2$ (T) stands for the resistance of the heating wire 14b at temperature T.

If two heating wires 14a and 14b have a same temperature-to-resistance characteristic (then, $R_1$ (T) is equal to $R_2$ (T)), and if the gas rate sensor has no angular velocity, the sensor output signal x will be zero as seen from the equation (1). In this ideal case no correction of gas rate sensor output signal will be required.

Figure 5:
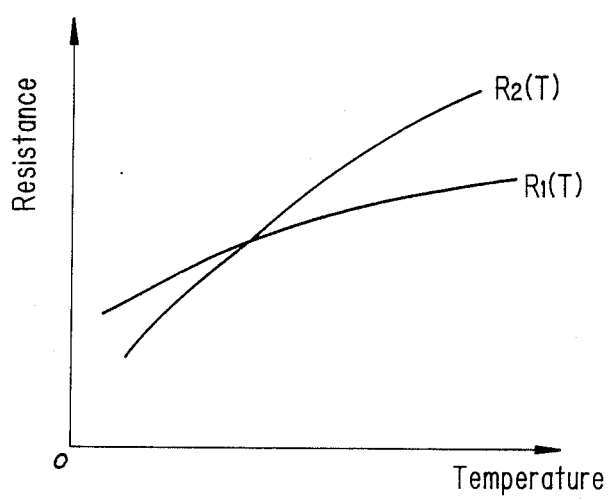
FIG. 5 is a graph representing the temperature-to-resistance characteristics of a pair of heating wires.

As a matter of fact, however, it is difficult to select and use a pair of heating wires 14a and 14b which have a same temperature-to-resistance characteristic. Usually, two heating wires 14a and 14b have different characteristics as shown in FIG. 5. Therefore, even if the gas rate sensor has no angular speed, the gas rate sensor output signal cannot be zero. Also, an error will be caused in detecting the angular velocity of the gas rate sensor because these heating wires have no same temperature-to-resistance characteristic.

Figure 1:
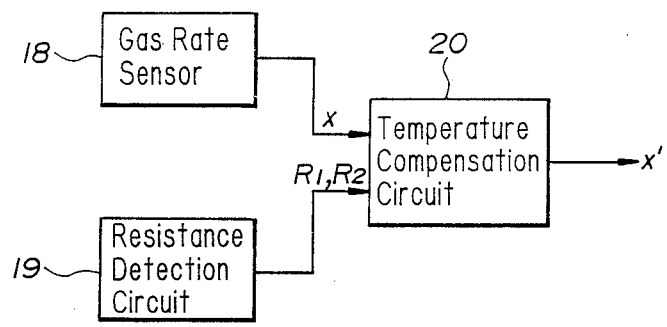
FIG. 1 shows diagramaticallly the gas rate sensor equipped with temperature compensation means.
Figure 2:
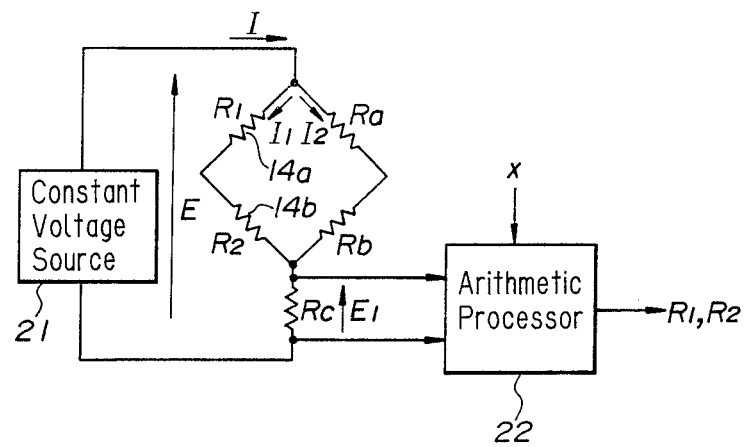
FIG. 2 is a wiring diagram of a resistance detection circuit.

Necessary temperature compensation of gas rate sensor output signal x will be effected according to the present invention as follows:

FIG. 1 shows a gas rate sensor system according to one embodiment of the present invention. It comprises a gas rate sensor 18, a resistance detection circuit 19 for detecting the resistances $R_1$ and $R_2$ of the heating wires 14a and 14b used in the gas rate sensor 18, and a temperature compensation circuit for effecting a temperature compensation of the gas rate sensor output x in response to the detected heating wire resistances $R_1$ and $R_2$ and the gas rate sensor output signal x. FIG. 2 shows the structure of the resistance detection circuit 19 as comprising a bridge having the heating wires 14a and 14b and two known resistances Ra, Rb, another known resistance series-connected to the bridge, and a constant voltage source 21 connected across the series connection of the bridge and the resistance Rc. An arithmetic processor 22 is connected across the series resistance Rc, and the arithmetic processor 22 uses the voltage $E_1$, appearing across the series resistance Rc and the gas rate sensor output signal x to carry out the following arithmetic operation for determining the resistances $R_1$ and $R_2$ of the heating wires 14a and 14b:

The following equations hold for the resistance circuit of FIG. 2:

$$E - E_1 = (R_1 + R_2)I_1 = (Ra + Rb)I_2 \tag{2}$$

$$I_1 + I_2 = I \tag{3}$$

$$E_1 = I \cdot Rc \tag{4}$$

From Equations (2), (3) and (4) the following equation is derived:

$$R_1 + R_2 = \frac{Rc(E-E_1)(Ra+Rb)/E_1}{(Ra+Rb) - Rc(E-E_1)} \tag{5}$$

Now, $(R_1 + R_2)$ is represented by y, that is, $$(R_1 + R_2) = y \tag{6}$$

The gas rate sensor output signal x is given by Equation (1) as follows:

$$x = (R_2/R_1) - 1 \tag{7}$$

Thus, from Equations (5), (6) and (7) $R_1$ and $R_2$ are derived as follows:

$$R_1 = y/(x+2) \tag{8}$$

$$R_2 = y \cdot (x+1)/(x+2) \tag{9}$$

By detecting the voltage $E_1$ across the resistance Rc the resistances $R_1$ and $R_2$ of the heating wires 14a and 14b can be determined from Equations (8) and (9) on real-time base.

The temperature compensation circuit 20 corrects the gas rate sensor output signal x by substracting from the gas rate sensor output signal x and offset value which is initially registered in the temperature compensation circuit 20 in accordance with the characteristics of the heating wires 14a and 14b in the gas rate sensor 18. Then, the temperature compensation circuit 20 makes a decision as to whether or not the gas rate sensor output signal x remains within a predetermined tolerance with respect to the offset value in case that the resistances $R_1$ and $R_2$ detected by the resistance detection circuit 19 increase or decrease together. In the affirmative case the temperature compensation circuit 20 will carry out correction by using the then gas rate sensor output signal x as a new offset value in place of the old one so that the gas rate sensor output signal x may become zero.

In the negative case the temperature compensation circuit 20 will not change the offset value, regarding the gas rate sensor as being subjected to the influence of angular velocity.

As is apparent from the above, a gas rate sensor system according to the present invention determines the resistances of the pair of heating wires of the gas rate sensor to detect the temperature change of the surrounding atmosphere of the heating wires in terms of the simultaneous increase or decrease of the pair of heating wire resistances, presuming that the gas rate sensor has no angular velocity effect when it is decided from the situation in which the gas rate sensor output signal remains within a given tolerance that the then gas rate sensor output signal is nearly equal to the predetermined offset value, and then using the then gas rate sensor output signal as a renewed offset value. Thus, a most appropriate temperature compensation of gas rate sensor output signal can be made to meet the temperature change of the atmosphere surrounding the pair of heating wires.

If a car is equipped with a gas rate sensor system according to the present invention for detecting any change in direction in which the car is running, the offset value can be renewed without stopping the car for that purpose.

We claim:

1. A gas rate sensor which provides an output signal in response to any difference between the output signals from a pair of thermal sensing elements due to the effect which an angular velocity exerts on the gas flow ejected from an associated nozzle over the pair of thermal sensing elements, characterized in that said gas rate sensor is equipped with:

means to effect temperature compensation of the gas rate sensor output signal by substracting an offset value from the gas rate sensor output signal;

means to determine the resistances of the pair of thermal sensing elements;

means to detect the situation in which the resistances of the pair of temperature sensor elements increase or decrease simultaneously;

means to make a decision as to whether or not the gas rate sensor output signal remains within a predetermined tolerance when such situation is detected; and means to permit the gas rate sensor output signal to be used as a new offset value when the gas rate sensor output signal remains within a predetermined tolerance.

2. A gas rate sensor according to claim 1 wherein a bridge circuit is composed of parallel connection of a series connection branch of said pair of temperature sensor elements and a series connection branch of first and second known resistances; a third resistance is connected to said bridge circuit; and the voltage appearing across said third resistance when a dc voltage is applied across the series connection of said bridge circuit and said third resistance is determined, and an arithmetic operation is effected on the determined voltage and the gas rate sensor output signal to determine the resistances of said pair of temperature sensor elements.

* * * * *